United States Patent [19]
Tran et al.

[11] 3,773,488
[45] Nov. 20, 1973

[54] IONIC PENETRATION OF VITREOUS OBJECTS

[75] Inventors: Thach Lan Tran, Cesson; Alain Bonnetin, Clichy-sous-Bois, both of France

[73] Assignee: Saint-Gobain, Neuilly-sur-Siene, France

[22] Filed: Sept. 9, 1970

[21] Appl. No.: 70,784

[30] Foreign Application Priority Data
Sept. 10, 1964   France ............................. 6930800

[52] U.S. Cl. ............................................. 65/30
[51] Int. Cl. ......................................... C03c 21/00
[58] Field of Search ............... 204/130; 260/46.5 R; 156/329, 315; 65/114, 115, 30

[56] References Cited
UNITED STATES PATENTS
3,486,995   12/1969   Evers ................................ 204/130
3,218,220   11/1965   Weber ............................... 204/130
3,174,919   3/1965    Spremulli .......................... 204/130
1,832,607   11/1931   Zworykin .......................... 204/130
1,785,888   12/1930   Cox et al. .......................... 204/130
3,524,737   8/1970    Doyle et al. ........................ 65/30
3,287,201   11/1966   Chisholm et al. .................... 65/30

FOREIGN PATENTS OR APPLICATIONS
6,501,168   8/1965    Netherlands ........................ 65/30

Primary Examiner—Howard S. Williams
Assistant Examiner—R. L. Andrews
Attorney—Pennie, Edmonds, Morton, Taylor and Adams et al.

[57] ABSTRACT

Vitreous objects such as glass and ceramics are strengthened by replacing medium sized ions by smaller ions and thereafter replacing the smaller ions by ions larger than the medium sized ions. The first step is conveniently by thermal ion exchange and the second by electrolytic ion exchange. A new apparatus forms a perfect seal for the electrolytic impaction.

7 Claims, 2 Drawing Figures

PATENTED NOV 20 1973

3,773,488

INVENTORS
TRAN THACK LAN
ALAIN BONNETIN
BY
Bauer and Seymour
ATTORNEYS

IONIC PENETRATION OF VITREOUS OBJECTS

This invention relates to the ionic penetration of vitreous objects such as plates and sheets of glass or ceramic. A system is known by which a plate of glass can be strengthened by the electrolytic substitution of larger for smaller ions in the glass. According to that process a glass plate is arranged between anodic and cathodic baths of which the anode contains an ion of an element larger than one contained in the glass. An electrical field is set up between an anode in the anode bath and a cathode in the cathode bath and the larger ions travel from the anodic electrolyte into the glass plate, expelling the smaller ions into the cathode compartment and putting the outer layers of the glass, in which smaller ions have been replaced by larger ions, under compression. A balancing of forces occurs, putting the center of the plate under tension stresses.

In order to carry out the process various apparatus have been tried but have been faced with a common problem, the short circuiting of the electrical field around the edge of the glass plate, which defeats the process, as it is essential for the field to travel through the plate, not around it. As the problem of ionically impacting a glass plate to strengthen it is known, this invention will be described in its application to that problem.

The invention relates particularly to improvements in the treatment of glass and ceramic articles by ion exchange under the impulse of an electrical field.

The impaction of the surface of a glass or ceramic object by ion exchange under the power of an electrical field is often applied to glass plates to strengthen them. In the process the plate serves as a diaphragm through which pass the lines of force of the field, requiring that the anode and cathode compartments be isolated from each other so as to confine the field to passage through the plate.

It is an object of the invention to improve the process, to seal the anode and cathode compartments from each other, to confine the electrical field to passage through the plate, and to improve the general process and the product which is produced.

The objects of the invention are accomplished, generally speaking, by a method of subjecting a vitreous object to ionic flow which comprises sealing the object onto the end of an annular mating part which is substantially impervious to ionic flow, covering each face of the object with an electrolytic bath containing an electrode, of which one bath contains an element which is to flow ionically into the object, and passing an electric field from electrode to electrode through the baths and the object in a direction and with an intensity which establishes ionic flow of the element into the object; and by apparatus for the ionic packing of a vitreous object which comprises an anode compartment containing an anode, a cathode compartment containing a cathode, and a wall between the cathode compartment and the anode compartment consisting essentially of the vitreous object, said object being sealed to a mating annular face on at least one said compartment, and both said compartments containing conductive liquids capable of transmitting ions to and from the object under a field of force supplied by the electrodes.

According to the invention the receptacles for the anode or cathode bath has the form of an annulus the edge of which is conformed to a mating face on the object. In the case of a flat glass plate the edge or rim of the annulus or annular wall of the compartment lies in a plane and can be matched to a mating surface on the plate. In the case of a flat plate the rim of the compartment will be just slightly smaller in circumference but of the same shape. The edge of the receptacle, or the mating face of the sheet, or both will be coated with an impermeable adhesive, impermeable both to field and to fluid, the mating faces will be brought together and the adhesive will be hardened. This forms a compartment, a receptacle for the anode or cathode bath, with the plate to be treated as a diaphragm closing one end. By combining this structure with another electrode compartment of opposite sign the process of ion exchange can be carried out through the plate more efficiently than before. The lines of force of the electric field pass almost exclusively through the glass plate, the two compartments being rigorously isolated. According to one mode of operating the invention the first electrolytic compartment is composed of the plate and its attached annulus and the second electrolytic compartment is composed of an ordinary electrolytic cell of sufficient size to receive the first compartment within it. According to a second mode the second compartment is also provided with an annular rim which matches a mating face on the glass plate so that the plate serves as a diaphragm between opposed compartments of similar construction, both of which are sealed to it in the same way but to opposite sides.

The drawings illustrate two forms of the invention, of which

Figure 1:
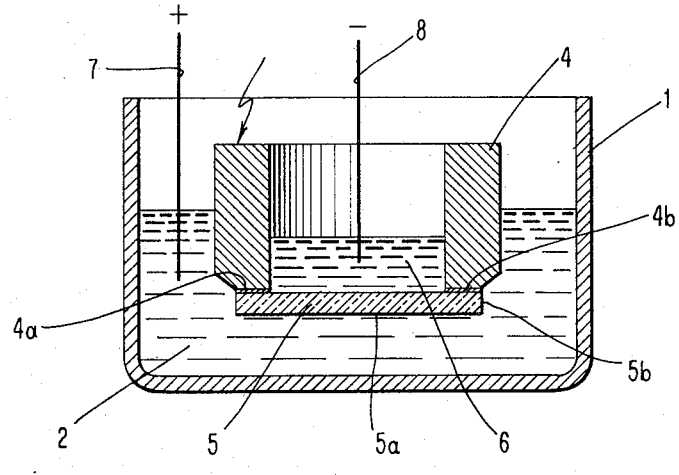
FIG. 1 is a vertical section through an electrolytic apparatus according to the invention.

In the apparatus of FIG. 1 the anode compartment includes a receptacle 1 which holds an electrolyte liquid 2. The cathode compartment includes an annulus 4 made of a dielectric, of material which is electrically insulating, the lower face 4a of which is mated to the periphery of the upper face of the glass plate 5. The mating faces of the annulus and the plate are sealed and bonded together by an adhesive 4b. Thus the annulus and plate constitute the cathode compartment which contains electrolyte 6 and into which dips the cathode 8. The anode compartment 1 is large enough to receive the cathode compartment, the electrolyte 2, and the anode 7. When the anode and cathode are supplied with adequate electrolytic power an electric field is established which causes the ions in electrolyte 2 to migrate into the glass and original ions to be expelled from the glass into the cathode electrolyte.

It is to be observed that all of the plate 5 is exposed to the passage of the field and to ion exchange, the ions passing through the face 5a and through the vertical edges 5b.

Figure 2:
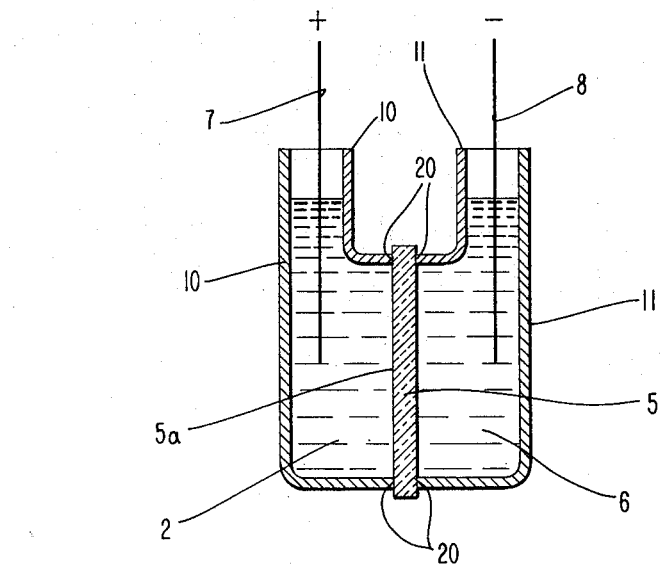
FIG. 2 is a vertical section through a modification.

In FIG. 2 the glass plate 5 is clasped between and sealed to matching annular faces 20—20 of two shells 10, 11. The shells are mirror images of each other and have open tops through which the anode 7 and cathode 8 enter the electrolytes 2 and 6. The annular faces 20—20 are sealed to mating faces of the glass by adhesive as described for FIG. 1.

In this form of the invention a narrow rim at the edge of the plate 5 is not subjected to the passage of the electric field set up by the electrodes and electrolytes.

In FIG. 2 the shells may be of electrical insulating material or electrically conductive, but in FIG. 1 the cathode compartment 4 must be made of electrical insulating material.

As these apparatus and processes are to be used not only at low but at high temperature, for instance at the temperature of molten salt baths, it is necessary that an adhesive capable of withstanding the conditions which are to be employed should be adopted. This presents no problem at low temperature but a substantial problem at high temperature. It is an object of the invention to provide adhesives which will be useful throughout the full range of usefulness of the process.

This object is accomplished by the use as an adhesive of the alkyl-aryl-silicone class of polymerizable resins. A preferred subclass of these resins for use at temperatures up to 450°–460°C. are the methyl phenyl silicones. A preferred member of the subclass is methyl phenyl silicone in which the ratio $C_6H_5$:Si is between 0.9 and 1.75 inclusive, and the ratio $CH_3$:Si is between 0.25 and 0.5, inclusive. These resins can be used successfully below 460°C. but above that temperature will char. They are quite satisfactory at 450°C.

To form the seals a silicone resin of this type is applied in the cold by any satisfactory means, for instance by brush or by burette, to one or both mating faces, which may be preliminarily scoured with emery and cleaned. A film of about 0.2 to 0.3 mm. is adequate and eliminates bubble formation during polymerization. An industrial resin called SISS 805 can be used. After application of the resin, for instance to the edge of the shell, it is heated to about 230°C. for ten minutes, and cooled to about 60°C. at which temperature it is in a tacky adhesive state affording a tight seal without being loose. On the other hand, if it is cooled to room temperature after partial polymerization at 230°C. it becomes hard and does not adhere well, in which case it can be reheated at the moment of use, or the mating faces can be reheated to impart renewed powers of adhesion. The first of these techniques is the faster.

It is sometimes useful to apply some resin over the joints after the parts have been mated to reinforce the seal and block off any inadvertently formed fissures.

The resin, after polymerization and application to the mating faces forms a tight seal without further treatment; it becomes hard when cooled to room temperature and polymerizes to hardness when used in hot processes.

Tests have shown that such joints remain tight and satisfactory after 16 hours of use at 430°C. even if the shells become deformed. At 450°C. the electrical insulating powers of the resin are still satisfactory, and no chemical side reactions occur with the electrolytes, even when molten potassium nitrate is used in one or in both compartments at this temperature.

Many high temperature refractories are known which are electrically non-conductive and may be used for the construction of the apparatus of FIG. 1. The apparatus of FIG. 2 can be made of any substance which will stand the temperature used, and not react with the electrolyte, as conductivity is of no importance.

In a modification of the apparatus of FIG. 2 the level of the liquid electrolyte is lowered below the upper edge of the object and the upper horizontal seal is omitted, but such structure runs the risk of short circuiting and the apparatus of FIG. 2 is preferred.

In general, with some of the usual electrolytes a current of about 6 mA/cm.$^2$ suffices. Among the salts used in a state of fusion are $NaNO_3$(306°C.) and $KNO_3$ (340°C.). As the conductibility of glass increases with the temperature it is advisable to work at high temperature, which takes less power and gives better results. In general the ion exchange reaction is carried out at above 400°C. and not above 450°C. In this range is obtained the highest efficiency.

The objective of the ion exchange in glass plates is to replace small ions (Na, Li) by larger ions (K).

EXAMPLE 1

Silica-soda-lime glass of ordinary windshield type, composition $SiO_2$ 71 percent by weight, $Al_2O_3$ 1% CaO 11%, MgO 3%, $Na_2O$ 14%, 2 mm. thick, was mounted as in FIG. 1 and treated as follows:

The external container was aluminum.

The separation ring was "Pyrex" glass.

The electrode was non-polarizable platinum with a sleeve of porous sillimanite.

Temperature 430°C. Current density 10 mA/cm.$^2$, corresponding to a voltage of 60 to 100.

Time of treatment: 15 minutes.

Thickness of K layer obtained, 90 $\mu$m.

Polarity was reversed for 9 minutes after which each face had a layer in which K had replaced Na to a depth of 55 $\mu$m.

EXAMPLE 2

The electrochemical reinforcement was preceded by a purely thermal ion exchange at 600°C. in a bath containing the eutectic $LiSO_4/MnSO_4$. During this phase the surface sodium present in the glass was replaced by lithium without establishing strains other than those due to thermal constriction during cooling.

2a. Sodium ions were used to expel lithium ions during a period of treatment lasting 10 minutes. The initial lithium impregnation was to a depth of 150 $\mu$m. A bath of $KNO_3$ at 430°C. and 4 mA/cm.$^2$ was applied in the apparatus of Example 1 for 35 minutes. The anode face received K to a depth of about 75 $\mu$m. which established a compression state of 6,000 bars. This compressed layer was followed by a tensioned state toward the center of the sheet which was at about 5,000 bars. The elimination of lithium from the opposite face established a compression state approximating a maximum of 4,000 bars.

2b. After subjecting one face of a glass plate to the sodium-lithium exchange for 5 minutes, producing a lithic layer of about 100 $\mu$m., the plate is reversed so that that layer becomes cathodic. After imposition of a current of 4 mA/cm.$^2$ for 45 minutes at 400°C. the lithium was eliminated and a compression state of about 4,000 bars was formed in a layer about 60 $\mu$m. thick.

EXAMPLE 3

In this example a vitroceramic plate 2 mm. thick was treated in the apparatus of FIG. 2. The piece had the composition $SiO_2$ 56 percent by weight, $Al_2O_3$ 6%, CaO 19%, Mg O 4.5%, $Na_2O$ 9.5%, F 5%. The two shells of FIG. 2 were aluminum. The electrodes were platinum covered with fritted alumina. The electrolyte was molten $KNO_3$. The treatment was at 450°C. under 3 mA/cm.$^2$ for 10 minutes. Penetration by K into the test piece was to a depth of 25 $\mu$m.

As many apparently widely different embodiments of the present invention may be made without departing from the spirit and scope thereof, it is to be understood that the invention is not limited to the specific embodiments.

What is claimed is:

1. A method of ionically reinforcing a vitreous object which comprises, adhesively sealing the object along a line of seal onto the end of an annular mating part which is substantially impervious to ionic flow, by coating the line of seal on either the mating part or the object, evenly with a polymerizable adhesive, polymerizing the adhesive to the tacky state, contacting the mating part and the object along the line of seal, and polymerizing the adhesive to a state of solidity, covering each face of the object with discrete electrolytic baths, respectively, each containing a respective one of two electrodes, one said bath containing ions of an alkali metal which are to flow into the corresponding face of the object, and passing an electric current from one electrode to the other, through the baths and the object in a direction and with an intensity which effects flow of alkali metal ions from said one bath into the face of the object contacted thereby.

2. A method according to claim 1 in which the polymerizable adhesive is an alkyl-aryl-silicone.

3. A method according to claim 2 in which the polymerizable adhesive is methyl phenyl silicone.

4. A method according to claim 3 wherein the ratio $C_6H_5/Si$ is between 0.9 and 1.75, and the ratio $CH_3/Si$ is between 0.25 and 0.5.

5. A method according to claim 4 in which said one bath is a molten potassium salt melting at temperatures about 450° C.

6. A method according to claim 1 in which the object is preliminarily subjected to thermal ion exchange by contact with a bath consisting essentially of a mixture of lithium sulfate and manganese sulfate at a temperature of about 600° C.

7. A method of ionically reinforcing a vitreous object which comprises sealing to a first surface of the object a part having a closed line of seal and forming with an area of the first surface a container for electrolyte, by first applying to the object or the part along the line of seal, an alkyl-aryl-silicone polymerizable adhesive, polymerizing the adhesive to the tacky state, contacting the object and part along the line of seal, and polymerizing the adhesive to solidity, the part being impervious to ionic flow, establishing in the container a first molten electrolytic bath containing ions of an alkali metal and covering said area, establishing a second molten electrolytic bath in contact with a second area of a surface of the object opposite said first surface, and passing an electric current from one electrolytic bath to the other and through the object, in a direction and with an intensity which effects flow of alkali metal ions from the first bath into the area of the object contacted thereby.

* * * * *